United States Patent
Lam et al.

(10) Patent No.: US 8,435,335 B2
(45) Date of Patent: May 7, 2013

(54) DESICCANT REGENERATION

(75) Inventors: Joseph K-W Lam, Bristol (GB);
Franklin Tichborne, Bristol (GB);
Simon Masters, Bristol (GB); David Parmenter, Uckfield East Sussex (GB)

(73) Assignee: Airbus Operations Limited, Bristol (GB)

( * ) Notice: Subject to any disclaimer, the term of this patent is extended or adjusted under 35 U.S.C. 154(b) by 284 days.

(21) Appl. No.: 12/871,410

(22) Filed: Aug. 30, 2010

(65) Prior Publication Data

US 2011/0061539 A1    Mar. 17, 2011

(30) Foreign Application Priority Data

Sep. 11, 2009 (GB) ................................. 0915954.2

(51) Int. Cl.
*B64D 37/02* (2006.01)
*B01D 53/04* (2006.01)

(52) U.S. Cl.
USPC ............. 96/126; 96/112; 96/146; 244/135 R

(58) Field of Classification Search ............... 96/112, 96/143, 146; 95/14, 117, 121, 126, 148; 244/135 R
See application file for complete search history.

(56) References Cited

U.S. PATENT DOCUMENTS

| | | | |
|---|---|---|---|
| 2,976,950 A * | 3/1961 | Smith | 95/117 |
| 3,732,668 A * | 5/1973 | Nichols | 96/174 |
| 3,906,798 A * | 9/1975 | Dray | 73/384 |
| 4,832,711 A * | 5/1989 | Christel et al. | 95/14 |
| 5,130,018 A * | 7/1992 | Tolman et al. | 210/172.5 |
| 5,509,956 A * | 4/1996 | Opperman et al. | 95/109 |
| 5,581,903 A * | 12/1996 | Botich | 34/264 |
| 6,226,888 B1 * | 5/2001 | Lang | 34/332 |
| 6,432,169 B1 * | 8/2002 | Kluwe et al. | 95/52 |
| 6,908,498 B2 * | 6/2005 | Ament et al. | 95/278 |
| 2005/0241700 A1 * | 11/2005 | Cozens et al. | 137/587 |

FOREIGN PATENT DOCUMENTS

| | | |
|---|---|---|
| GB | 2357983 A | 7/2001 |
| GB | 2379607 A | 3/2003 |

OTHER PUBLICATIONS

UK Search Report for GB0915954.2 issued Jan. 5, 2010.

* cited by examiner

*Primary Examiner* — Frank Lawrence, Jr.
(74) *Attorney, Agent, or Firm* — Lowe Hauptman Ham & Berner, LLP

(57) ABSTRACT

An aircraft fuel tank ventilation system, comprising a desiccative dehumidifying device including a desiccant medium disposed in flow communication between a vent open to the atmosphere and a fuel tank, and a microwave energy transmitter for energizing liquid water in the desiccant medium to facilitate regeneration of the medium. Also, a method of regenerating a desiccant medium of a dehumidifying device of an aircraft fuel tank ventilation system, the method comprising directing air through the desiccant medium, and transmitting microwave energy into the desiccant medium for energizing liquid water in the desiccant medium to facilitate regeneration of the medium.

17 Claims, 7 Drawing Sheets

DESICCANT REGENERATION

RELATED APPLICATIONS

The present application is based on, and claims priority from, Great Britain Application Number 0915954.2, filed Sep. 11, 2009, the disclosure of which is hereby incorporated by reference herein in its entirety.

FIELD OF THE INVENTION

The present invention relates to an aircraft fuel tank ventilation system having a desiccative dehumidifying device, and more particularly to a system and method for regenerating a desiccant medium of the dehumidifying device.

BACKGROUND OF THE INVENTION

Water is an unavoidable contaminant in fuel. It can affect fuel system component reliability and lead to operational delays and increased maintenance activities. In addition, the propensity for microbiological contamination is directly proportional to the presence of water and the temperature within fuel tanks. Sources of water in aircraft fuel tanks is from fuel loaded into the aircraft fuel tanks during refuel (dissolved water) and from air entering the aircraft fuel tanks via its ventilation system. It is estimated that up to 30-40% of water in the fuel of aircraft fuel tanks is currently entering via the ventilation system, depending on atmospheric conditions.

During refill while the aircraft is on the ground, fuel is loaded onto the aircraft at a high volume flow rate to reduce the turnaround time. The fuel displaces the air in the fuel tanks as the tanks fill up. The air is pushed out of the fuel tanks via the ventilation system.

During climb, due to decreasing ambient pressure as the aircraft ascends, air expands in the ullage. Although the engines are consuming fuel, the rate of fuel consumption is less than the rate of air expansion. This results a net outflow of air through the ventilation system.

During cruise, the fuel level decreases steadily as the engines consume the fuel. A decrease in the fuel level causes an increase in the ullage volume, and excess air is drawn in from ambient via the ventilation system to equalise pressures. At cruise, the ambient air is relatively cold and dry.

During descent, due to increasing ambient pressure as the aircraft descends, air contracts in the ullage. This results a net inflow of ambient air through the ventilation system. The ingress of ambient air brings relatively warm, humid air into the fuel system. Water condenses when the humid air comes into contact with cold structures and surfaces in the fuel system. The cold surfaces may be, for example, the fuel tank and equipment surfaces, or the fuel-air interface. The fuel system is cold during descent as the aircraft will likely have just spent some time at cold, cruise temperatures.

A desiccative dehumidifying device can be used in an aircraft fuel tank ventilation system to dehumidify the ingress humid air. However, to reduce maintenance requirements there is a need for a system and method for regenerating (drying) the desiccant medium of the dehumidifying device.

SUMMARY OF THE INVENTION

A first aspect of the invention provides an aircraft fuel tank ventilation system, comprising a desiccative dehumidifying device including a desiccant medium disposed in flow communication between a vent open to the atmosphere and a fuel tank, and a microwave energy transmitter for energizing liquid water in the desiccant medium to facilitate regeneration of the medium.

A further aspect of the invention provides a method of regenerating a desiccant medium of a dehumidifying device of an aircraft fuel tank ventilation system, the method comprising directing air through the desiccant medium, and transmitting microwave energy into the desiccant medium for energizing liquid water in the desiccant medium to facilitate regeneration of the medium.

The desiccant medium of the dehumidifying device may be used to extract water from humid air which comes into contact with the desiccant medium during the descent phase of the aircraft flight, and possibly also whilst the aircraft is on the ground. The desiccant medium may therefore become partially or fully saturated with water extracted from the humid air. The invention is advantageous in that the desiccant medium can be regenerated (dried) by promoting evaporation of water from the desiccant medium by a process known as dielectric heating.

Water molecules are polar and hence rotate with the alternating field of the electromagnetic waves transmitted by the microwave transmitter into the desiccant medium. This molecular rotation causes interactions and collisions with adjacent water molecules thereby transferring energy to those adjacent molecules. By this process, the electromagnetic energy is converted into heat, which promotes evaporation of the water from the desiccant medium and hence regeneration, or drying, of the desiccant.

The microwave heating of the desiccant medium has advantages over other forms of heating. Heating with an electrical heating element or a heat exchanger, for example, would heat the outer surface of the desiccant medium and transfer heat into the desiccant medium primarily by conduction. Heating by conduction would limit the rate of heat transfer and create a large temperature gradient in the desiccant medium, resulting in some areas being over-heated and some under-heated and thereby not at the optimum operating condition. By contrast, the microwaves penetrate in the medium and give more effective and uniform heating.

Suitable commonly used desiccant media which are suitable for use with this invention are silica gel, calcium sulfate, calcium chloride, montmorillonite clay, and molecular sieves. Those skilled in the art will appreciate that this is not an exhaustive list and other media may be used. However, the desiccant medium is preferably a porous medium made from highly packed granules.

Whilst energizing the water in the desiccant medium will facilitate regeneration of the medium, it is also important that relatively dry air comes into contact with the desiccant medium whilst the microwave transmitter is operating to transport water vapour away from the desiccant medium. This may be effectively achieved by passing relatively dry air through the desiccant medium in a direction away from the fuel tank. During refill whilst the aircraft is on the ground and during the ascent phase of an aircraft flight there will be a net outflow of air through the ventilation system from the fuel tank towards the vent open to the atmosphere. The air from the fuel tanks will be relatively dry and therefore suitable to pass through the desiccant medium during the regeneration process. The humid air leaving the dehumidifying device during regeneration of the desiccant can be exhausted to the atmosphere via the vent.

The ventilation system may further comprise a microwave energy receiver. The receiver may form part of a microwave control system connected to the transmitter and the receiver. The energy transmitted will be partially absorbed by the water present in the desiccant medium. Energy that is not absorbed by the water, or elsewhere, will be present at the receiver. As the water content varies, the amount of energy absorbed by the water changes. Therefore, a signal from the receiver may be used to measure and control the transmitted energy level, such that the transmitted energy is kept at an optimal level to regenerate the desiccant medium. The control system may be adapted to maintain a substantially constant receive power level when the transmitter is operating. In this way, the heating effect remains constant. The amount of transmitted microwave energy is proportional to the amount of water in the desiccant such that the microwave energy per unit volume of water is constant. This ensures that the water is not heated up too rapidly by putting too much microwave energy per unit volume of water to cause high temperatures. When the desiccant is dry, the transmitted microwave energy would be zero so preventing energy wastage.

The control system may further comprise one or more temperature sensors for sensing the temperature of the desiccant medium. The control system may be adapted to stop heating when the temperature of the desiccant exceeds a predetermined level, so as to prevent degradation of the desiccant.

The dehumidifying device may further comprise a conduit, and the desiccant medium may be disposed in the conduit. The conduit may be in flow communication between the vent and the fuel tank. One or more electro-magnetic containment elements may be provided for containing the microwave energy within a region of the conduit. This ensures there is no microwave leakage to the fuel tank which may interfere with avionics, sensors and other electromechanical devices in the fuel tank. It also eliminates the possibility of unintentional heating up of fuel and other media in the fuel tank by the microwaves to a high temperature.

In some circumstances, it may be beneficial that air passing between the vent and the fuel tank does not pass through the dehumidifying device. For example, the high volume flow rate of air exiting the fuel tank via the vent during refuelling may be too high to pass through the dehumidifying device. The ventilation system may therefore further include a bypass of the dehumidifying device in flow communication between the vent and the fuel tank. The bypass may include a valve. The valve may be used for controlling flow through the bypass.

Many aircraft fuel systems include a vent tank for equalizing pressure changes between ambient and the ullage(s). In a preferred embodiment, the dehumidifying device is disposed in flow connection between the vent and the vent tank. The vent tank may include an valve selectively open to the atmosphere and/or an over pressure protector.

In case the regeneration at refill and ascent is not sufficient to adequately regenerate the desiccant, then it is also possible to regenerate the desiccant medium during the cruise phase of the aircraft flight. During cruise, fuel is being consumed by the engines and so there is ordinarily a net inflow of air through the ventilation system to the fuel tank. However, where the vent tank is provided, then some of the ambient cold dry air drawn in through the vent open to the atmosphere during cruise may be directed through the dehumidifying device and through a valve which is selectively open to the atmosphere.

The dehumidifying device can offer a maintenance-free operation, if the desiccant medium is adequately regenerated during certain flight phases, or whilst the aircraft is on the ground.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
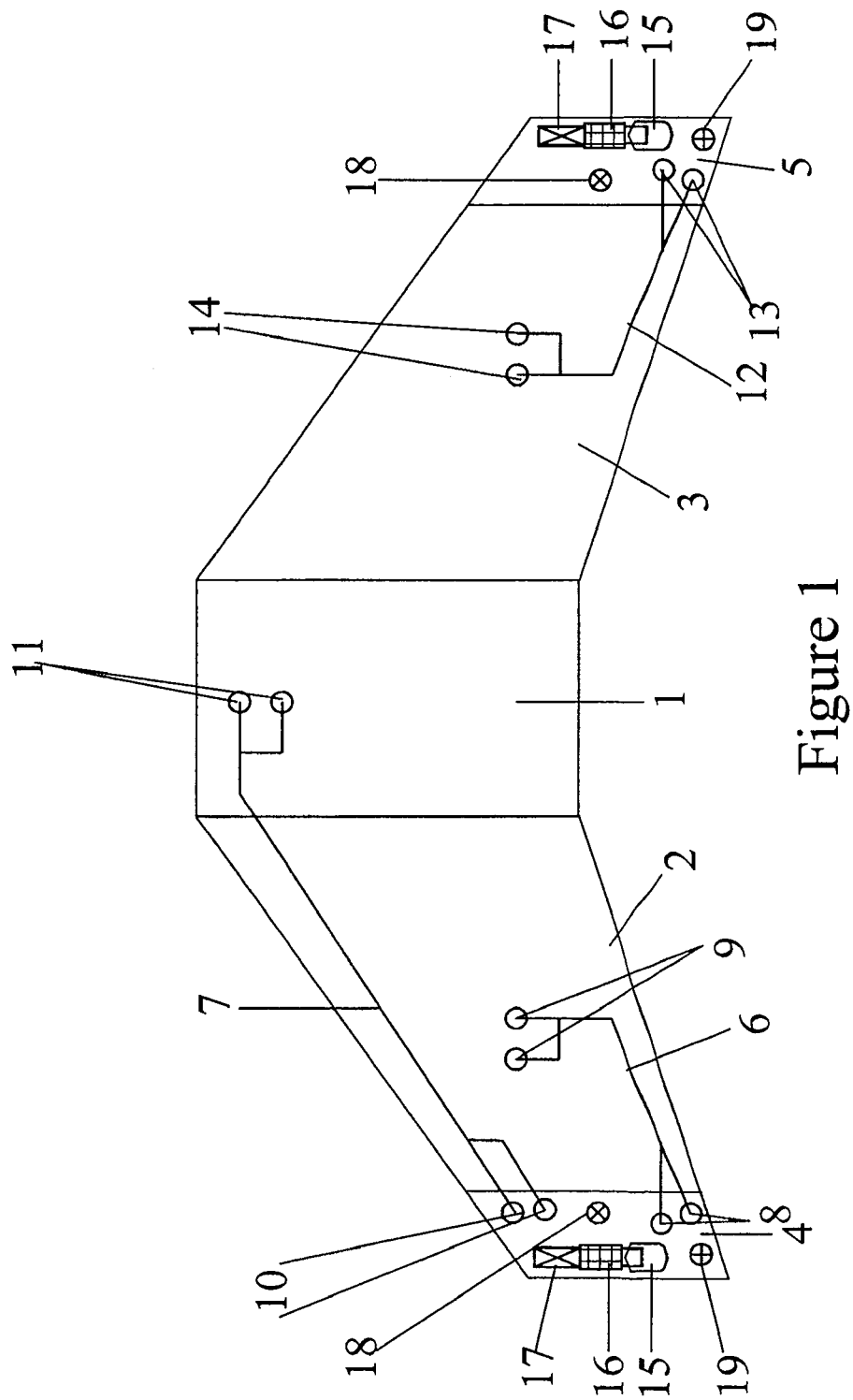
FIG. 1 illustrates schematically an aircraft wing having three fuel tanks and a ventilation system including a dehumidifying device.

FIG. 1 shows a general ventilation system architecture for a three-tank configuration of an aircraft fuel system. The fuel system includes a centre tank 1, a left wing tank 2 and a right wing tank 3. The ventilation system includes a left vent tank 4 and a right vent tank 5. The left vent tank 4 ventilates the centre tank 1 and the left wing tank 2 by means of ventilation pipes 6, 7 which open into ventilation inlets 8, 9, 10, 11. The right vent tank 5 ventilates the right wing tank 3 by means of ventilation pipe 12 which opens into ventilation inlets 13 and 14. The centre tank could equally be vented by the right vent tank. It is to be noted that all of the fuel tanks are ventilated but are not cross-ventilated, i.e. the left and right vent tanks are not connected by ventilation paths.

Each vent tank 4, 5 includes a NACA vent, or NACA scoop, 15 which opens to the atmosphere on the lower aerodynamic surface of the aircraft wing. The vent tanks 4, 5 further include a vent protector, or flame arrestor, 16 and a dehumidifying device 17. The dehumidifying device 17 is disposed in flow communication between the NACA vent 15 and the respective vent tank 4, 5. The vent tanks 4, 5 further include an over pressure protector 18 and a valve 19, which can be opened to connect the interior of the vent tanks 4, 5 with ambient air.

Figure 2:
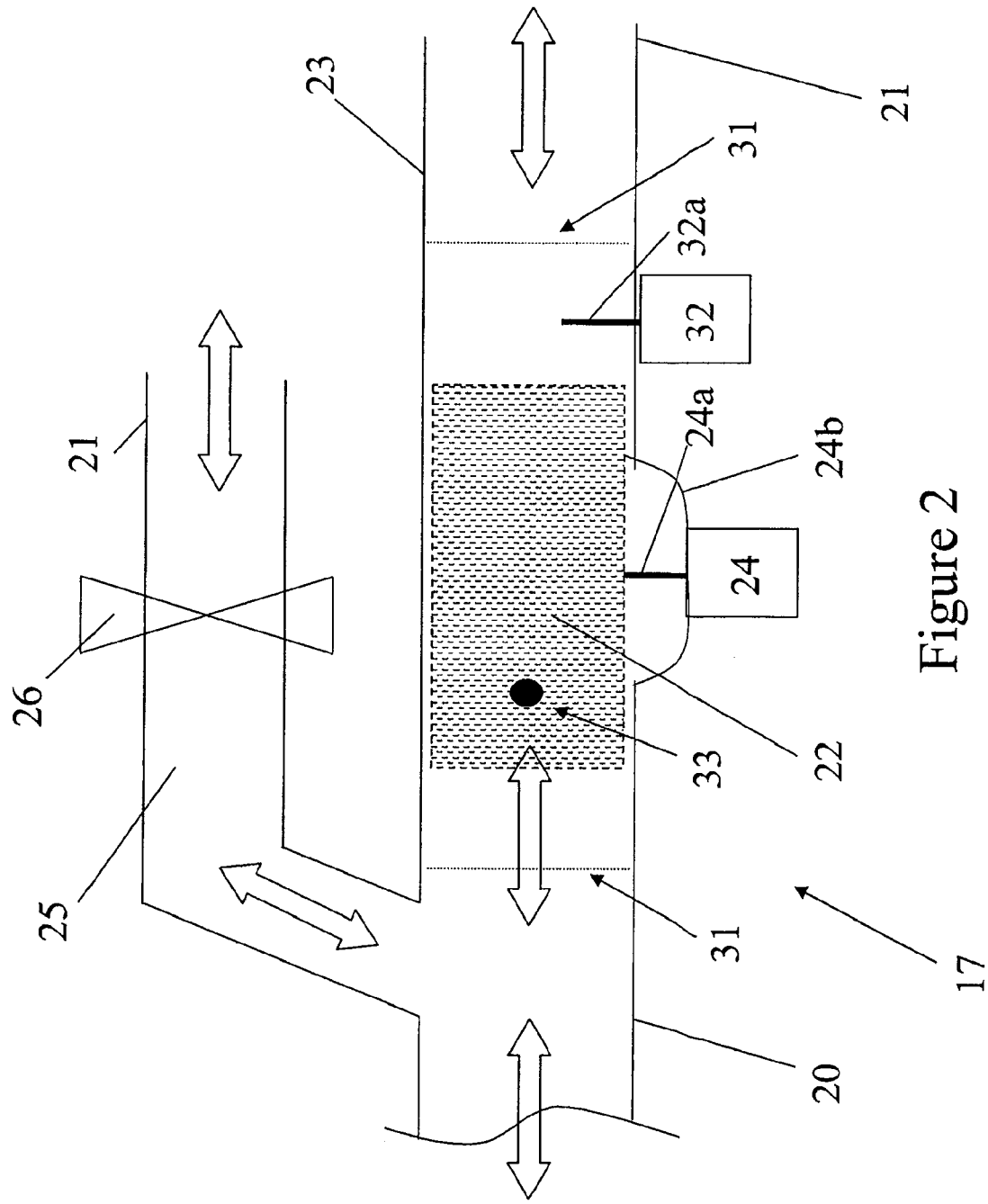
FIG. 2 illustrates schematically the dehumidifying device having a bypass.

FIG. 2 shows the dehumidifying device 17. The dehumidifying device is connected on one side 20 to the vent protector 16 and on the other side 21 to the respective vent tank 4, 5. The dehumidifying device 17 includes a desiccant medium 22 which fills a conduit 23 between the vent protector side 20 and the vent tank side 21. A microwave transmitter 24 having a dipole antenna 24a and a reflector 24b is connected to a wall of the conduit 23 such that the transmitter 24 can radiate towards the desiccant medium 22. The dipole antenna 24a is disposed within the conduit 23. The transmitter is controlled by a microwave control system 30 (not shown in FIG. 2), which will be described in detail later with reference to FIG. 3. At each end of conduit 23, there is an electromagnetic containment gauze 31 for preventing the microwaves from the transmitter 24 from leaving the conduit 23.

The dehumidifying device 17 also includes a bypass conduit 25 having a valve 26 which also connects between the vent protector side 20 and the vent tank side 21. The valve 26 is selectively openable to control flow of air through the bypass 25. As can be seen from the flow arrows (block arrows) in FIG. 2, there is a net flow of air through the dehumidifying device 17 from the vent tank side 21 to the vent protector side 20, or vice versa, depending on the pressure differential between ambient and that of the vent tanks 4, 5. In FIG. 2, the valve 26 is shown in the open position allowing air to flow through both the bypass 25 and the desiccant medium 22. Closing the valve 26 forces all air flowing through the dehumidifying device 17 to be directed through the desiccant medium 22.

Figure 3:
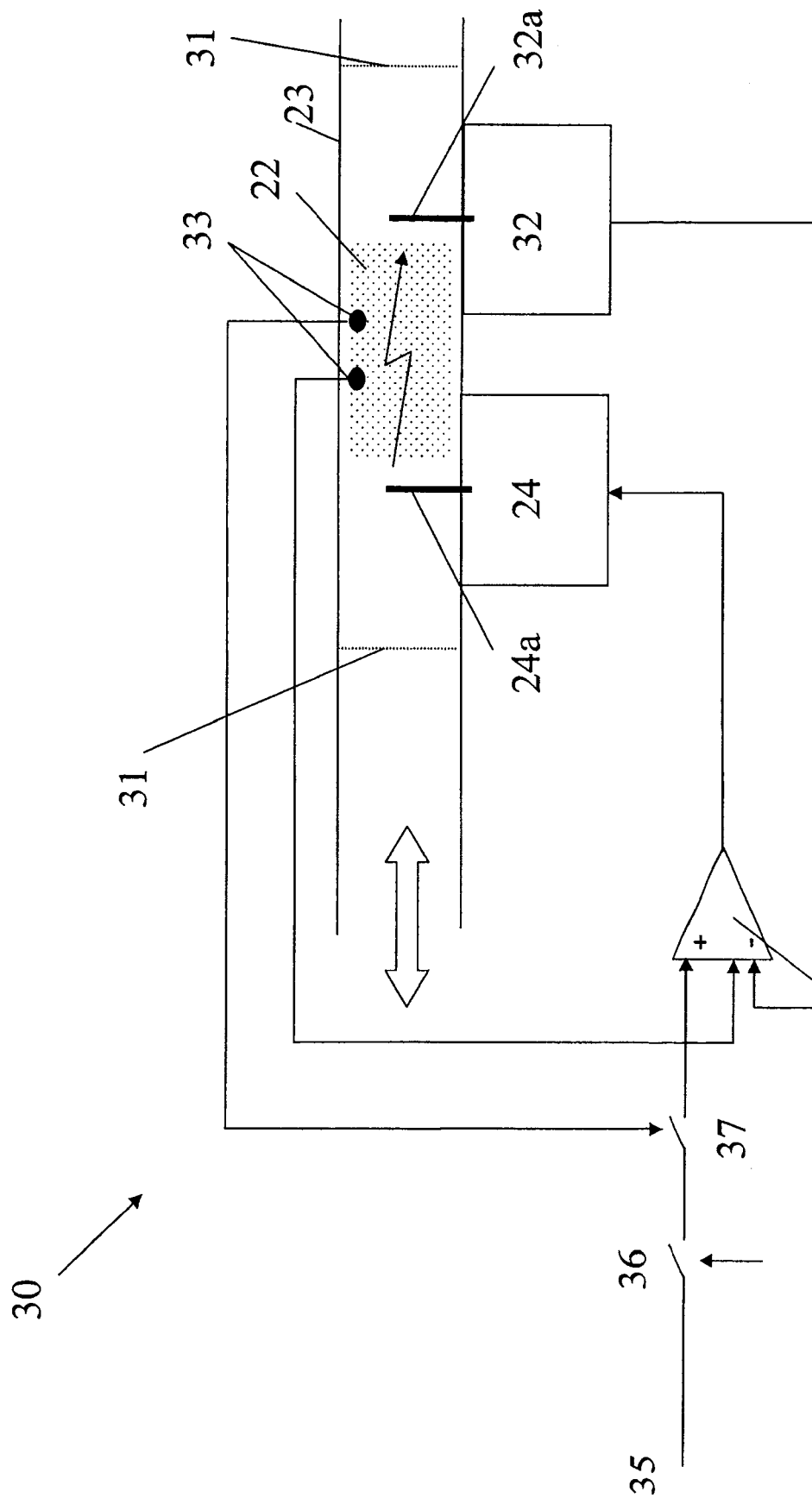
FIG. 3 illustrates schematically the microwave control system of the dehumidifying device.

Turning now to FIG. 3, the microwave control system 30 includes a microwave receiver 32 having a dipole antenna 32a disposed within the conduit 23, such that the desiccant medium 22 is between the transmitter 24 and the receiver 32. Desiccant temperature sensors 33 are embedded in the desiccant medium 22. The receiver 32 is electrically connected to one input of a controller 34. The controller 34 is connected to a power supply 35 via a system enable switch 36 and an excessive temperature interlock 37. The excessive temperature interlock 37 is connected to one of the desiccant temperature sensors 33. The other desiccant temperature sensor 33 is connected to another input of the controller 34. The transmitter 24 is electrically connected to the output of the controller 34.

The desiccant medium 22 will absorb moisture from humid air flowing through the dehumidifying device 17 from the vent protector side 20 to the vent tank side 21. Relatively dry air flowing back though the dehumidifying device 17 (not via the bypass 25) from the vent tank side 21 to the vent protector side 20 will regenerate (dry) the desiccant medium 22. The microwave control system 30 is operable to cause the microwave energy transmitter 24 to transmit microwaves through the desiccant medium 22 to heat water in the desiccant medium by dielectric heating. Energizing the water in the desiccant medium 22 in this way significantly enhances the regeneration of the medium when there is a net flow of air through the desiccant medium from the vent tank side 21 to the vent protector side 20. Typically, there will be a net inflow of air through the dehumidifying device 17 towards to fuel tanks during cruise and descent, and a net outflow of air through the dehumidifying device 17 from the fuel tanks during refill and ascent.

The microwave control system 30 controls the power output of the transmitter 24 using adaptive feedback control to ensure that the desiccant medium 22 is not heated to too high a temperature, and to ensure that the desiccant medium is being optimally heated for the amount of water in the desiccant. When operating, the microwave energy from the transmitter 24 is absorbed by the water in the desiccant 22. The greater the amount of water, the more energy is absorbed. The receiver 32 receives microwave energy that has not been absorbed by the water, or elsewhere. The containment gauzes 31 ensure the microwave energy does not escape along the conduit 23 outside of the heating zone. A signal from the receiver 32 is fed back to the controller 34. The controller 34 maintains a constant receive power level when the transmitter is operating. In this way, the power output of the transmitter is increased when the water content in the desiccant in high, and the power output of the transmitter is decreased when the water content in the desiccant in low. The receive power level can be predetermined for optimal heating such that the controller 34 backs off the transmitted power automatically when the water content is low.

If the air flow is insufficient to remove water and heat from the desiccant medium 22, the temperature of the desiccant will start to rise. One of the temperature sensors 33 feeds a signal back to the controller 34 to reduce the transmitted power level when the temperature of the desiccant medium 22 exceeds a predetermined level for optimal heating. This supplements the receive power level feedback control. The other temperature sensor 33 is connected to the excessive temperature interlock 37 to remove power to the controller 34 if the desiccant temperature exceeds a maximum level at which degradation of the desiccant medium 22 may occur. This ensures safe operation of the controller 34. The optimal temperature for regenerating the desiccant is dependent on the desiccant material used, but a temperature of around 100 to 150 degrees Celsius at sea-level may be typical. The temperature could be lower at high altitude due to lower ambient pressure. The excessive temperature interlock 37 may be switched when the temperature exceeds, say, 10% above the optimal temperature.

Operation of the ventilation system will now be described with reference to FIGS. 4 to 7, which are block diagrams showing the flow paths of air and the control of the ventilation system during various aircraft flight phases. In these Figures, solid lines and blocks represent the air flow paths and flow components, and dashed lines and blocks represent the pressure control signals and control components. The direction of the arrows between the blocks indicate the direction of air flow and the direction of control signals.

Figure 4:
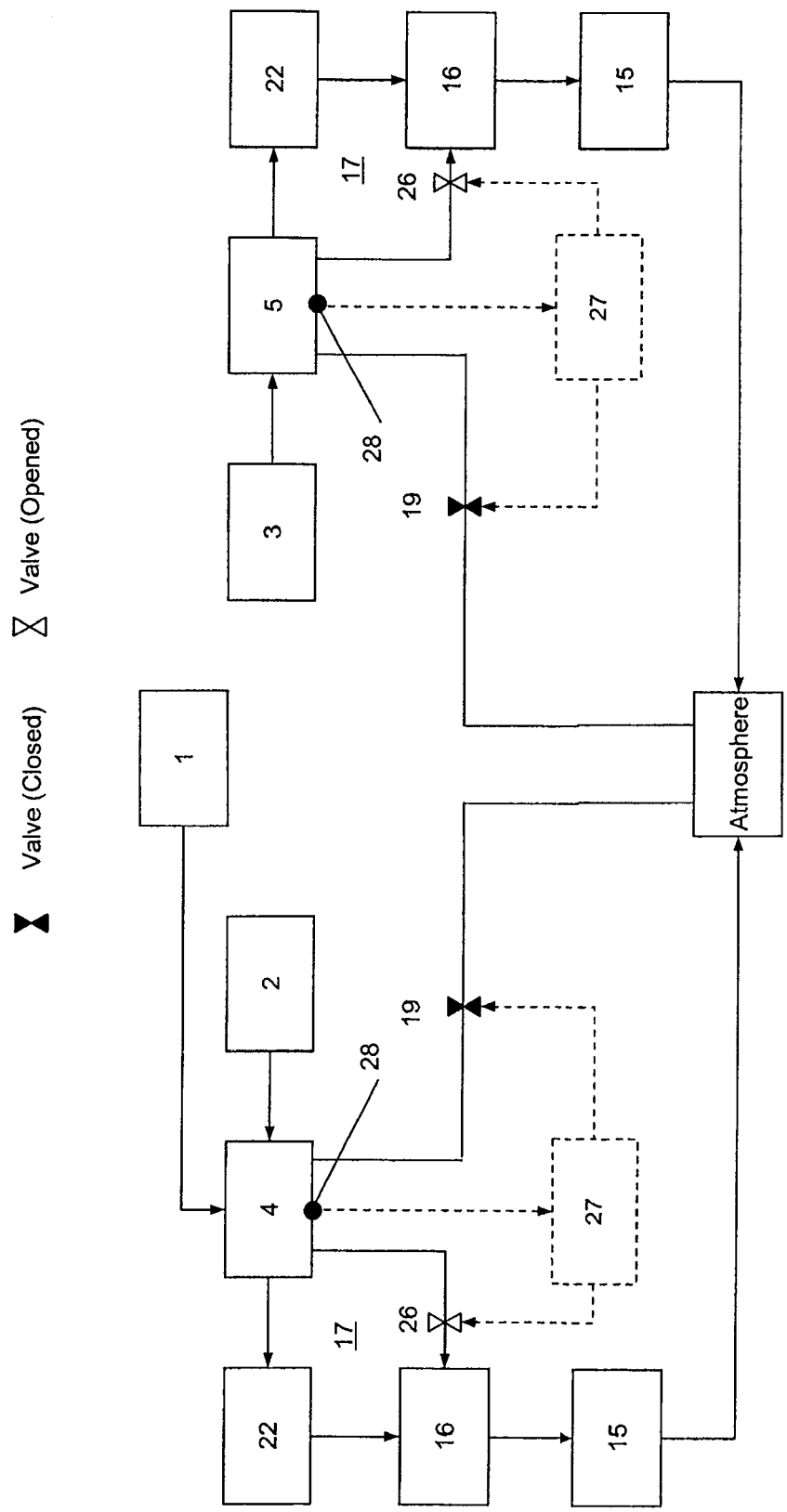
FIG. 4 illustrates a block diagram showing the flow paths of air and the control of the ventilation system during refill of the fuel tanks.

FIG. 4 shows a bock diagram of the ventilation system during refill of the fuel tanks 1, 2, 3. During refill, a high volume flow rate of fuel displaces air in the tanks 1, 2, 3 pushing the air out via the ventilation system. Air pushed out of centre tank 1 and left wing tank 2 enters left vent tank 4, whilst air pushed out of right wing tank 3 enters right vent tank 5. It is important that the air which is being pushed out from the vent tanks 4, 5 to the atmosphere passes through the vent protectors 16 so as to minimise the risk of ignition of fuel vapour within the air whilst the aircraft is on the ground. To ensure that the air passes from the vent tanks, 4, 5 to the NACA vents 15 via the vent protectors 16, the valves 19 are closed.

Due to the high volume flow rate of air being displaced from the tanks 1, 2, 3, the valves 26 are opened or partially opened such that air may pass directly from the vent tanks 4, 5 to the vent protectors 16 through the bypass 25 to prevent overpressure. However, some air will still pass through the desiccant medium 22 of the dehumidifying devices 17 and so the microwave transmitter 24 can be energised to regenerate the desiccant during refill by enabling the switch 36. It is intended that the valves 26 are controlled so that as much air as possible passes through the dehumidifying devices 17, without causing an overpressure. Control of the valves 19 and 26 is by controllers 27 which are connected to respective pressure sensors 28 on the vent tanks 4, 5. If the pressure sensors 28 detect a pressure differential higher than a critical limit between the pressure in the respective vent tank 4,5 and ambient, then valves 26 can be opened appropriately. While the aircraft is on the ground, the valves 19 are closed at all times so that the flow communication to the tanks 1,2,3 passes through the vent protectors 16 for safety. The air passing through the desiccant medium 22 during refill is relatively dry and so aids in drying the desiccant medium 22 to regenerate it. The air in the tanks 1,2,3 will have previously been dried by the desiccant medium 22 during descent.

Figure 5:
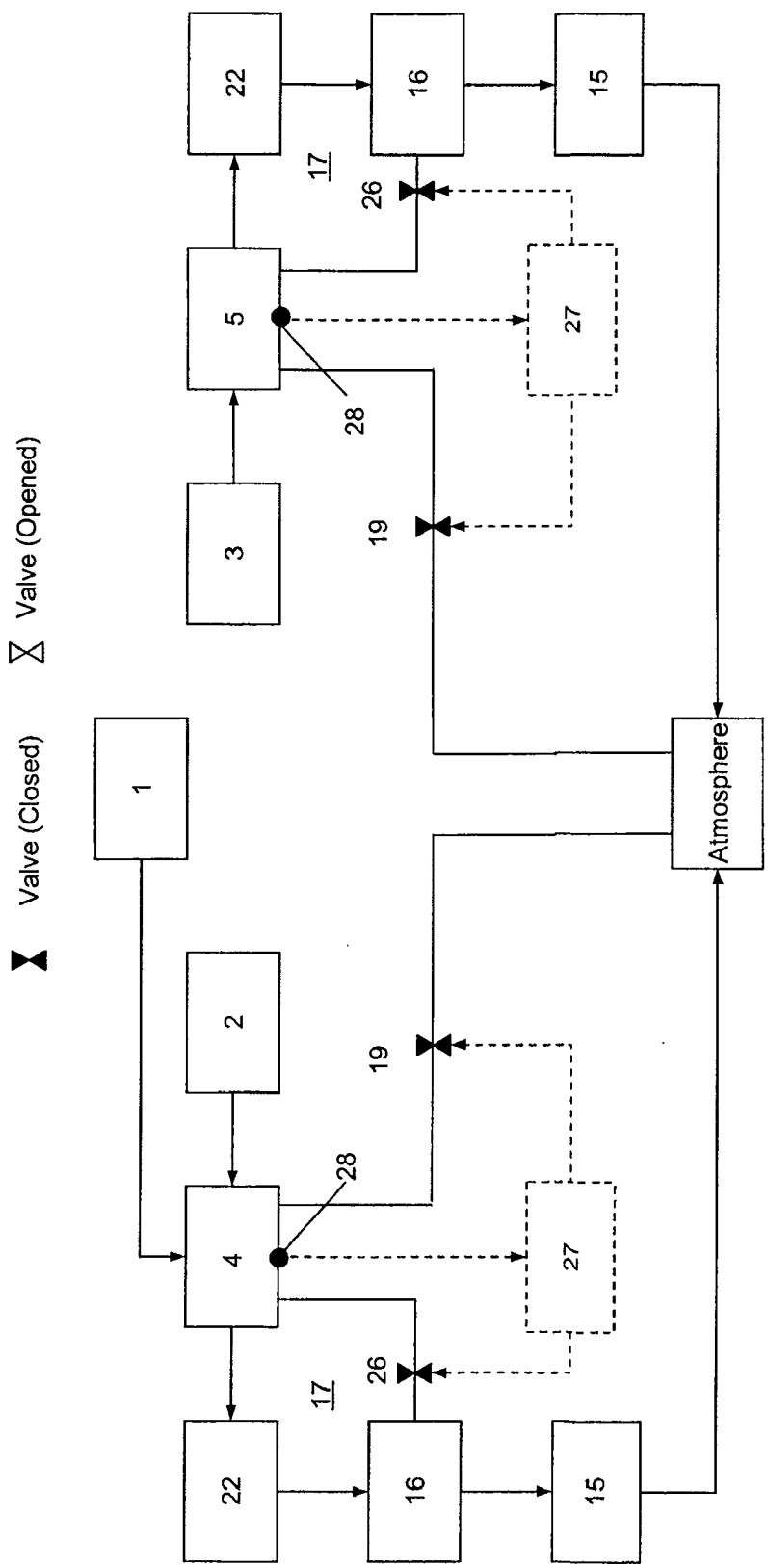
FIG. 5 illustrates a block diagram showing the flow paths of air and the control of the ventilation system during climb.

FIG. 5 shows a block diagram of the ventilation system during climb/ascent. As shown in FIG. 5, the valves 19 and 26 are all closed such that as the air in the fuel tanks 1, 2, 3 expands as the aircraft ascends, a relatively low volume flow rate of air is discharged through the desiccant medium 22 from the vent tank side 21 to the vent protector side 20 and out through the NACA vents 15. The microwave transmitter 24 can be energised to regenerate the desiccant during ascent by enabling the switch 36. The switch 36 may be controlled to close automatically during ascent by connection to the aircraft altimeter, for example. The desiccant medium 22 will have absorbed moisture from a previous flight, as will be discussed below. The air passing through the desiccant medium 22 during the climb is relatively dry and so aids in drying the desiccant medium 22 to regenerate it. In most circumstances, the desiccant medium 22 can be sufficiently regenerated during refill and ascent. Once regenerated, the desiccant medium 22 can be used again to dehumidify air flowing from the NACA vent towards the fuel tanks.

Figure 6:
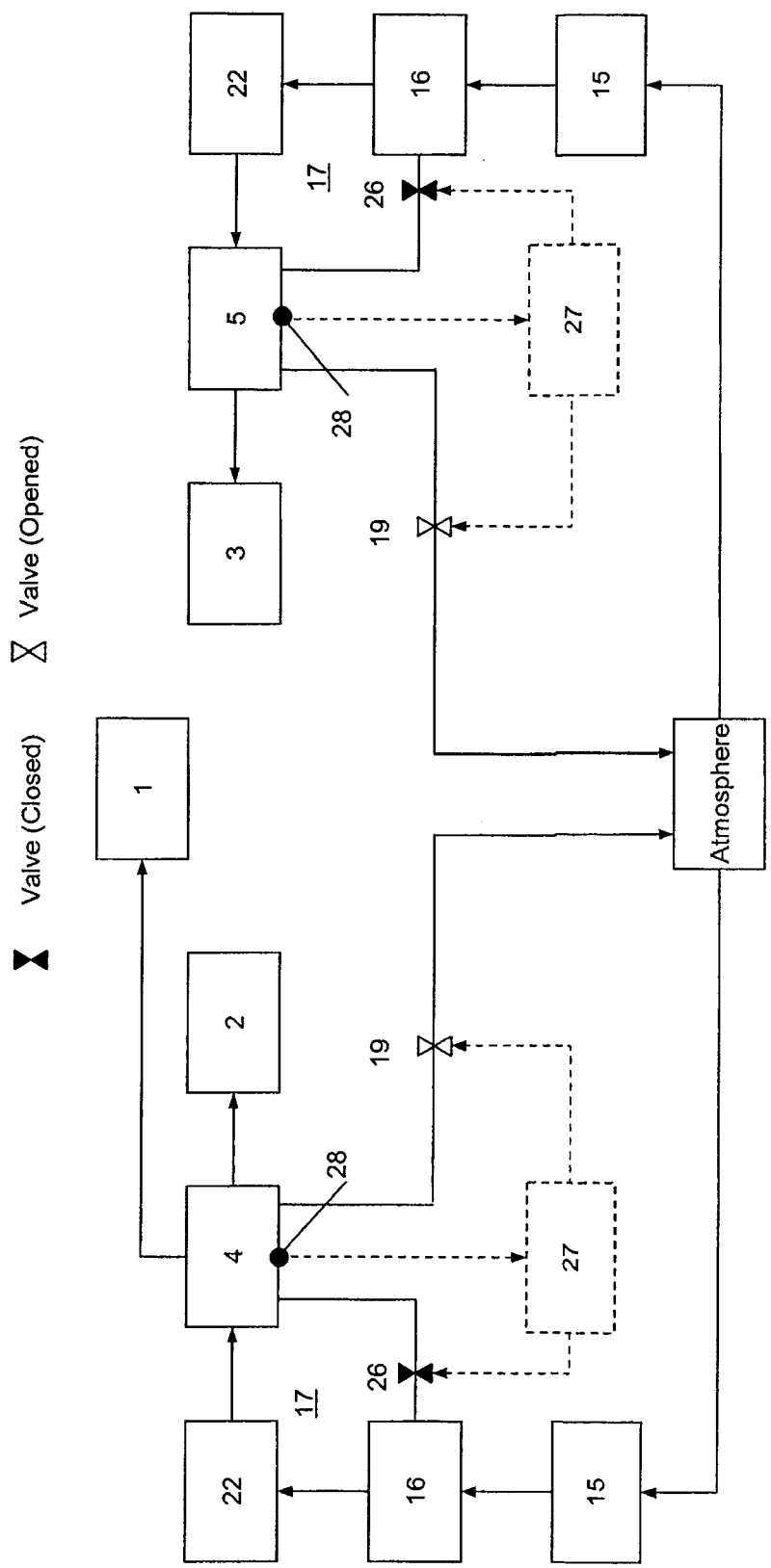
FIG. 6 illustrates a block diagram showing the flow paths of air and the control of the ventilation system during cruise.

FIG. 6 shows a block diagram of the ventilation system during cruise. During cruise, fuel in the tanks 1, 2, 3 is being consumed by the aircraft engines and so there is a slow net in-flow of air from the atmosphere through the NACA vents 15 towards the tanks 1, 2, 3.

If the regeneration at refill and ascent is insufficient, then it is possible to also regenerate the desiccant medium during cruise. As shown in FIG. 6, the valves 19 can be opened so as to allow air circulation through the NACA vents 15, into the vent tanks 4, 5 and to return out to the atmosphere though valves 19. As can be seen in FIG. 1, the valve 19 is positioned aft of the NACA vent 15 so as to cause a pressure differential to drive the flow of air through the respective vent tanks 4, 5. The valves 26 are closed at cruise such that air circulating through the vent tanks 4, 5 passes from the NACA vent 15 and through the desiccant medium 22 before entering the vent tanks 4, 5. At cruise, cold, dry atmospheric air flows from the vent protector side 20 through the desiccant medium 22 towards the vent tank side 21. The microwave transmitter 24 can be energised to regenerate the desiccant during cruise by enabling the switch 36. Moisture is released from the desiccant medium 22 and absorbed by the dry atmospheric air such that warm, humid air is discharged into the vent tanks 4, 5 before returning to the atmosphere via the valves 19. Since the net in-flow of air to the tanks 1, 2, 3 during cruise is slow, moisture released from the desiccant medium 22 does not substantially enter the tanks 1, 2, 3.

Figure 7:
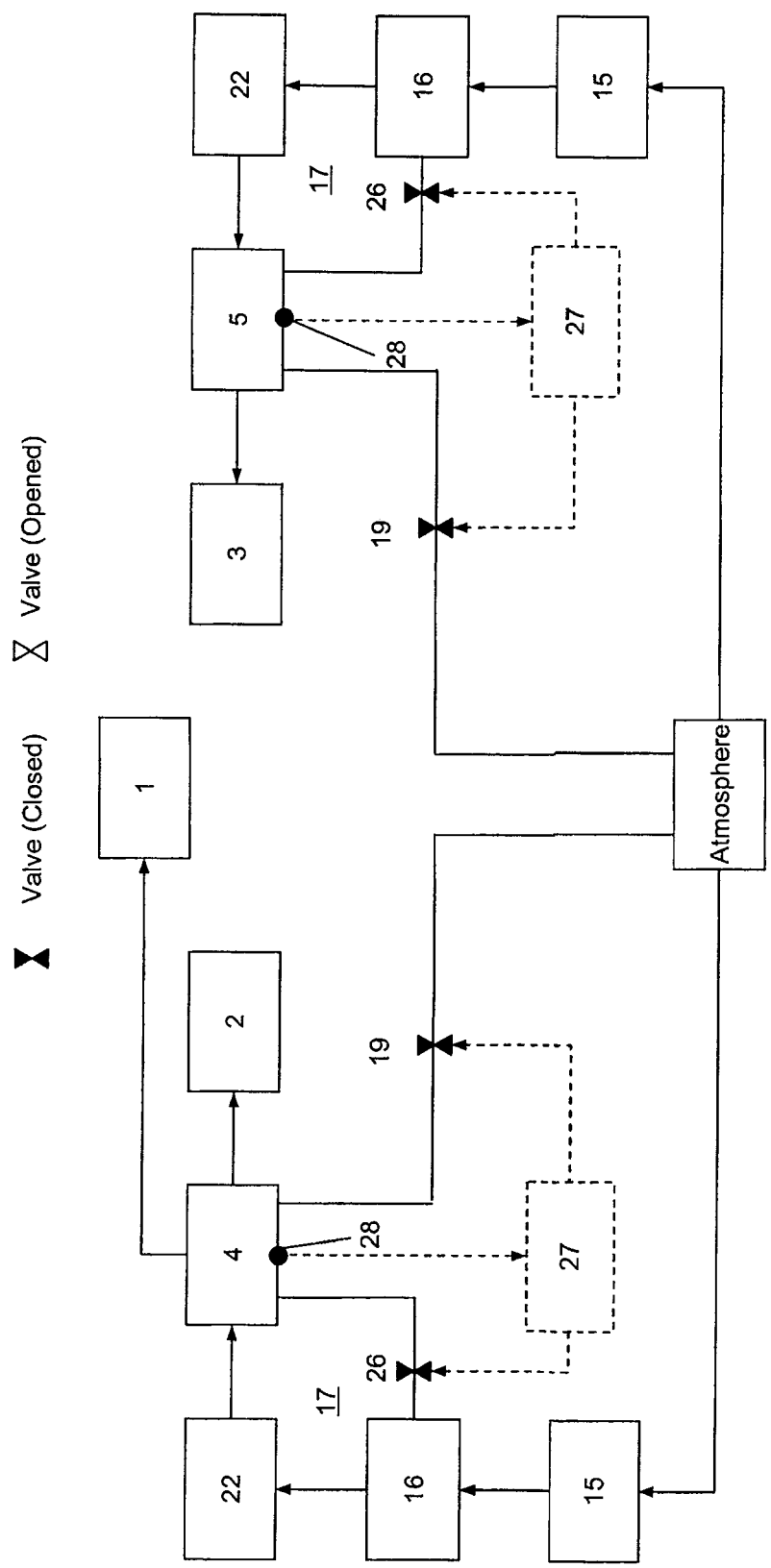
FIG. 7 illustrates a block diagram showing the flow paths of air and the control of the ventilation system during descent.

As mentioned previously, the dehumidifying devices 17 operate to remove water vapour from air flowing from the NACA vents 15 towards the tanks 1, 2, 3 during the descent phase of the aircraft flight. FIG. 7 shows a block diagram of the ventilation system during descent. As can be seen, the valves 19 and 26 are all closed. As the aircraft descends from high altitude, the air within the now largely empty fuel tanks 1, 2, 3 contracts significantly which causes a net flow of air from the atmosphere through the NACA vent 15 into the tanks 1, 2, 3. Since the valves 19 and 26 are all shut, the relatively warm, humid air flows in from the atmosphere through the NACA vents 15, the vent protectors 16 and through the desiccant medium 22 of the dehumidifying devices 17.

The desiccant medium 22 acts to dehumidify the air passing from the vent protector side 20 to the vent tank side 21 of the dehumidifying devices 17 by absorbing the moisture from the air passing therethrough. Relatively dry (dehumidified) air is discharged into the vent tanks 4, 5 and then via the arrangement of pipes 6, 7, 12 into the tanks 1, 2, 3. In this way, the dehumidifying devices 17 act to significantly dehumidify the air entering the aircraft fuel tanks 1, 2, 3 during descent and hence significantly reduce the amount of water within the fuel tanks.

The damp desiccant medium 22 retains the moisture absorbed during descent until it is once again dried during refill, ascent and possibly also cruise, as previously described. To improve the effectiveness of the desiccant medium 22 during descent, the microwave transmitter 24 which may still be being used to dry the desiccant medium 22 during cruise is switched off for a period of time, for example 5 minutes, before the descent. As the aircraft is still at high altitude at this stage, the desiccant medium 22 is allowed to cool to cruise ambient temperature before the descent. The cold desiccant medium 22 provide cold surfaces for moisture to condense upon as the aircraft begins the descent phase of the flight. This is a secondary effect to the desiccant property of the desiccant medium 22, and further increases the dehumidifying effectiveness of the dehumidifying devices 17.

Although the invention has been described in relation to a three-tank fuel system, the invention is applicable to a fuel system having any number of tanks, including one.

Although the invention has been described above with reference to one or more preferred embodiments, it will be appreciated that various changes or modifications may be made without departing from the scope of the invention as defined in the appended claims.

The invention claimed is:

1. An aircraft fuel tank ventilation system, comprising a desiccative dehumidifying device including a desiccant medium disposed in flow communication between a vent open to the atmosphere and a fuel tank, and a microwave energy transmitter for energizing liquid water in the desiccant medium to facilitate regeneration of the medium, wherein the ventilation system further comprises a microwave energy receiver and a controller connected to the transmitter and the receiver, and wherein the controller is adapted to increase and decrease the power output of the transmitter according to feedback from the receiver.

2. A ventilation system according to claim 1, wherein the control system is adapted to maintain a substantially constant receive power level when the transmitter is operating.

3. A ventilation system according to claim 1, wherein the control system further comprises one or more temperature sensors for sensing the temperature of the desiccant medium.

4. A ventilation system according to claim 1, further comprising one or more electro-magnetic containment elements for containing the microwave energy.

5. A ventilation system according to claim 1, further comprising a bypass of the dehumidifying device in flow communication between the vent and the fuel tank.

6. A ventilation system according to claim 5, wherein the bypass includes a valve.

7. A ventilation system according to claim 1, wherein the dehumidifying device is disposed in flow connection between the vent and a vent tank.

8. A ventilation system according to claim 7, wherein the vent tank includes an valve selectively open to the atmosphere.

9. A method of regenerating a desiccant medium of a dehumidifying device of an aircraft fuel tank ventilation system, the method comprising directing air through the desiccant medium, and transmitting microwave energy into the desiccant medium for energizing liquid water in the desiccant medium to facilitate regeneration of the medium, the method further comprising feedback control of the transmitted microwave energy, wherein the feedback control receives input from a microwave energy receiver and is adapted to increase and decrease the power input of a microwave energy transmitted used to transmit the microwave energy into the desiccant medium according to feedback from the receiver.

10. A method according to claim 9, wherein the feedback control receives input from one or more temperature sensors.

11. A ventilation system according to claim 1, wherein the power output of the transmitter is increased when the water content in the desiccant is high, and the power output of the transmitter is decreased when the water content in the desiccant is low.

12. A method according to claim 9, wherein the power output of the transmitter is increased when the water content in the desiccant is high, and the power output of the transmitter is decreased when the water content in the desiccant is low.

13. A method of regenerating a desiccant medium of a dehumidifying device of an aircraft fuel tank ventilation system comprising a vent tank having a vent open to the atmosphere and a valve selectively open to the atmosphere, the method comprising opening the valve, circulating air through the vent into the vent tank and out of the vent tank to the atmosphere through the open valve, directing air through a desiccant medium, and transmitting microwave energy into the desiccant medium for energizing liquid water in the desiccant medium to facilitate regeneration of the medium, wherein the moist air that has been passed through the desiccant medium is discharged to the atmosphere.

14. A method according to claim 13, wherein the method is operated during cruise.

15. An aircraft fuel tank ventilation system, comprising a desiccative dehumidifying device including a desiccant medium disposed in flow communication between a vent open to the atmosphere and a fuel tank, and a microwave energy transmitter for energizing liquid water in the desiccant medium to facilitate regeneration of the medium, wherein the dehumidifying device is disposed in flow connection between the vent and a vent tank, and wherein the vent tank includes a valve selectively open to the atmosphere allowing fluid circulation through the vent into the vent tank and out of the vent thank to the atmosphere through the open valve.

16. A method of regenerating a desiccant medium of dehumidifying a device of an aircraft fuel tank ventilation system comprising a vent open to the atmosphere, the method comprising directing air through the desiccant medium when there is a net flow of air from the fuel tank to the atmosphere via the vent, and transmitting microwave energy into the desiccant medium for energizing liquid water in the desiccant medium to facilitate regeneration of the medium when there is a net flow of air from the fuel tank to the atmosphere via the vent.

17. A method of regenerating a desiccant medium according to claim 16, wherein the method is operated during refilling of the fuel tank with fuel or during an ascent phase of a flight.

* * * * *